(12) United States Patent
Shiokawa (10) Patent No.: US 9,740,086 B2
(45) Date of Patent: Aug. 22, 2017

(54) WIDE FIELD ANGLE PROJECTION SYSTEM AND PROJECTION-TYPE IMAGE DISPLAY APPARATUS

(71) Applicant: SEIKO EPSON CORPORATION, Tokyo (JP)

(72) Inventor: Koji Shiokawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 29 days.

(21) Appl. No.: 14/991,248

(22) Filed: Jan. 8, 2016

(65) Prior Publication Data

US 2016/0216494 A1 Jul. 28, 2016

(30) Foreign Application Priority Data

Jan. 22, 2015 (JP) ................. 2015-010071

(51) Int. Cl.

| | |
|---|---|
| G03B 21/14 | (2006.01) |
| G02B 13/16 | (2006.01) |
| G02B 13/18 | (2006.01) |
| G02B 15/177 | (2006.01) |
| G02B 15/20 | (2006.01) |

(52) U.S. Cl.
CPC ........... *G03B 21/142* (2013.01); *G02B 13/16* (2013.01); *G02B 13/18* (2013.01); *G02B 15/177* (2013.01); *G02B 15/20* (2013.01)

(58) Field of Classification Search
CPC ...... G02B 13/16; G02B 13/18; G02B 15/177; G02B 15/20; G03B 21/142
See application file for complete search history.

(56) References Cited

U.S. PATENT DOCUMENTS

| | | | |
|---|---|---|---|
| 7,889,431 B2 | 2/2011 | Nagahara | |
| 2010/0165477 A1* | 7/2010 | Nagahara | ............... G02B 13/16 359/682 |
| 2014/0126067 A1* | 5/2014 | Nagahara | ............. G02B 15/177 359/663 |

FOREIGN PATENT DOCUMENTS

| | | |
|---|---|---|
| JP | 2010-152277 A | 7/2010 |
| JP | 2011-107200 A | 6/2011 |

* cited by examiner

*Primary Examiner* — Sultan Chowdhury
*Assistant Examiner* — Magda Cruz
(74) *Attorney, Agent, or Firm* — Oliff PLC (57) ABSTRACT

A projection system includes a first lens group to an n-th lens group with n being 6 or 7 sequentially arranged from a enlargement side. The first lens group includes a first-first lens group and a first-second lens group sequentially arranged from the enlargement side. The two lens groups are separated from each other by a variable distance for image plane correction. The first lens group and the n-th lens group are fixed and the second lens group to the (n−1)-th group are moved when the magnification is changed. The following conditional expression is satisfied: 2<BF/fw<2.8, where fw represents the focal length of the projection system operating at the wide angle end, and BF represents the air conversion length of the back focal distance of the projection system.

16 Claims, 9 Drawing Sheets

WIDE FIELD ANGLE PROJECTION SYSTEM AND PROJECTION-TYPE IMAGE DISPLAY APPARATUS

BACKGROUND

1. Technical Field

The present invention relates to a projection system suitable to be incorporated in a projector that enlarges and projects an image formed on an image display device and a projection-type image display apparatus that incorporates the projection system.

2. Related Art

In recent years, in a high-luminance (at least 10,000 lumens (lm), for example), high-resolution projector, it is desired to perform wide-field-angle image projection. JP-A-2010-152277 and JP-A-2011-107200 each disclose a projection system capable of achieving high luminance and high resolution. The projection system described in JP-A-2010-152277 is formed of first to sixth groups in each of which each lens is a single lens, and the magnification is changed by movement of the second to fifth groups with the first and sixth groups fixed. The projection system described in JP-A-2011-107200 is formed of first to sixth groups in each of which each lens is a single lens, and the magnification is changed by movement of the first to fifth groups with the sixth group fixed.

However, the projection system described in JP-A-2010-152277 provides a half field angle of 28° at the wide angle end, and the projection system described in JP-A-2011-107200 provides a half field angle of 28.2° at the wide-angle end. Each of the projection systems, each of which provides a half field angle smaller than 30°, is not a wide-field-angle projection system. Each of the projection systems is therefore insufficient in an application for a large screen in some cases because the distance between the projector and a screen is short.

SUMMARY

An advantage of some aspects of the invention is to provide a projection system capable of achieving not only high luminance and high resolution but also a wide field angle.

Another advantage of some aspects of the invention is to provide a projection-type image display apparatus that incorporates the projection system.

A projection system according to an aspect of the invention is a projection system including a first lens group to an n-th lens group with n being 6 or 7 sequentially arranged from a enlargement side. The first lens group includes a first-first lens group and a first-second lens group sequentially arranged from the enlargement side. The first-first lens group and the first-second lens group are separated from each other by a variable distance for image plane correction. The first lens group and the n-th lens group are fixed and the second lens group to the (n−1)-th group are moved when magnification is changed. The following conditional expression (1) is satisfied:

$$2<BF/fw<2.8 \quad (1)$$

where, fw represents a focal length of the projection system operating at a wide angle end, and BF represents an air conversion length of a back focal distance of the projection system.

According to the projection system described above, since the value BF/fw in the conditional expression (1) satisfies the range described above, a half field angle ranging from about 35° to 45° can be provided. Since the projection system is formed of the first lens group to the n-th lens group (n=6 or 7), and the second lens group to the (n−1)-th lens group are moved, a relatively large zooming ratio can be provided. Further, since the distance between the first-first lens group and the first-second lens group is configured to be variable for image plane correction, the first-first lens group is allowed to function as an image plane correction group, whereby shift of the image plane can be suppressed when the size of an image is changed. Precise image projection is thus achieved.

According to a specific aspect of the invention, in the first-first lens group, a lens disposed in a second position counted from the enlargement side is an aspheric lens. In this case, since an aspheric lens is disposed in the first-first lens group, the projection system can be designed with distortion and astigmatism suppressed. The aspheric lens is desirably made of a resin material depending on the degree of aspheric surface.

According to another specific aspect of the invention, the (n−1)-th lens group is formed of a positive first lens, a negative second lens, and a positive third lens. Employing the configuration described above allows suppression of variation in chromatic aberration of magnification produced when the magnification is changed.

According to another specific aspect of the invention, the following conditional expression (2) is satisfied:

$$|f(n-1)/fw|>5 \quad (2)$$

where f(n−1) represents a focal length of the (n−1)-th lens group, and the following conditional expressions (3) and (4) are satisfied:

$$vdf1-vdf2>20 \quad (3)$$

$$vdf3-vdf2>20 \quad (4)$$

where vdf1 represents an Abbe number of the first lens, vdf2 represents the Abbe number of the second lens, and vdf3 represents the Abbe number of the third lens. When the value f(n−1)/fw in the conditional expression (2), which describes the allocation of the focal length, is set to be greater than 5, the (n−1)-th lens group is a combination of a negative lens having a high refractive index and two positive lenses having low refractive indices. In this case, the Petzval sum of the (n−1)-th lens group can be increased to efficiently correct the image curvature. Further, setting the values vdf1−vdf2 and vdf3−vdf2 in the conditional expressions (3) and (4), which define the relationship among the Abbe numbers of the positive first lens, the negative second lens, and the positive third lens, to be greater than 20 allows suppression of variation in the chromatic aberration of magnification at the wide angle end and the longitudinal chromatic aberration produced when the magnification is changed.

According to another specific aspect of the invention, in the (n−1)-th lens group, the first lens and the second lens, and the second lens and the third lens are both separated by a distance of 3 mm or shorter. In this case, the chromatic aberration of magnification can be suppressed.

According to another specific aspect of the invention, the first lens group includes three negative spherical lenses adjacent to each other, and the following conditional expression (5) is satisfied:

$$vdN>60 \quad (5)$$

where vdN represents an Abbe number of the negative spherical lens closest to the reduction side among the three negative spherical lenses. That is, setting the value vdN in the conditional expression (5), which describes the Abbe number of the negative spherical lens closest to the reduction side to be greater than 60 allows suppression of the chromatic aberration of magnification produced when the magnification is changed.

According to another specific aspect of the invention, a zooming ratio over a range within which the magnification is changed is 1.4 or smaller. An optical system having a large field angle and a zooming ratio up to 1.4 is thus achieved.

According to another specific aspect of the invention, each of the first lens group to the n-th lens group is formed of single lenses. The single lens configuration eliminates a bonded surface and achieves a projection system corresponding to a high-luminance illumination system having an illuminance at least 10,000 lumens.

A projection-type image display apparatus according to another aspect of the invention includes any of the projection systems described above and an image formation optical section provided on an optical path upstream of the projection system.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projection lens according to an embodiment of the invention will be described below in detail with reference to the drawings.

Figure 1:
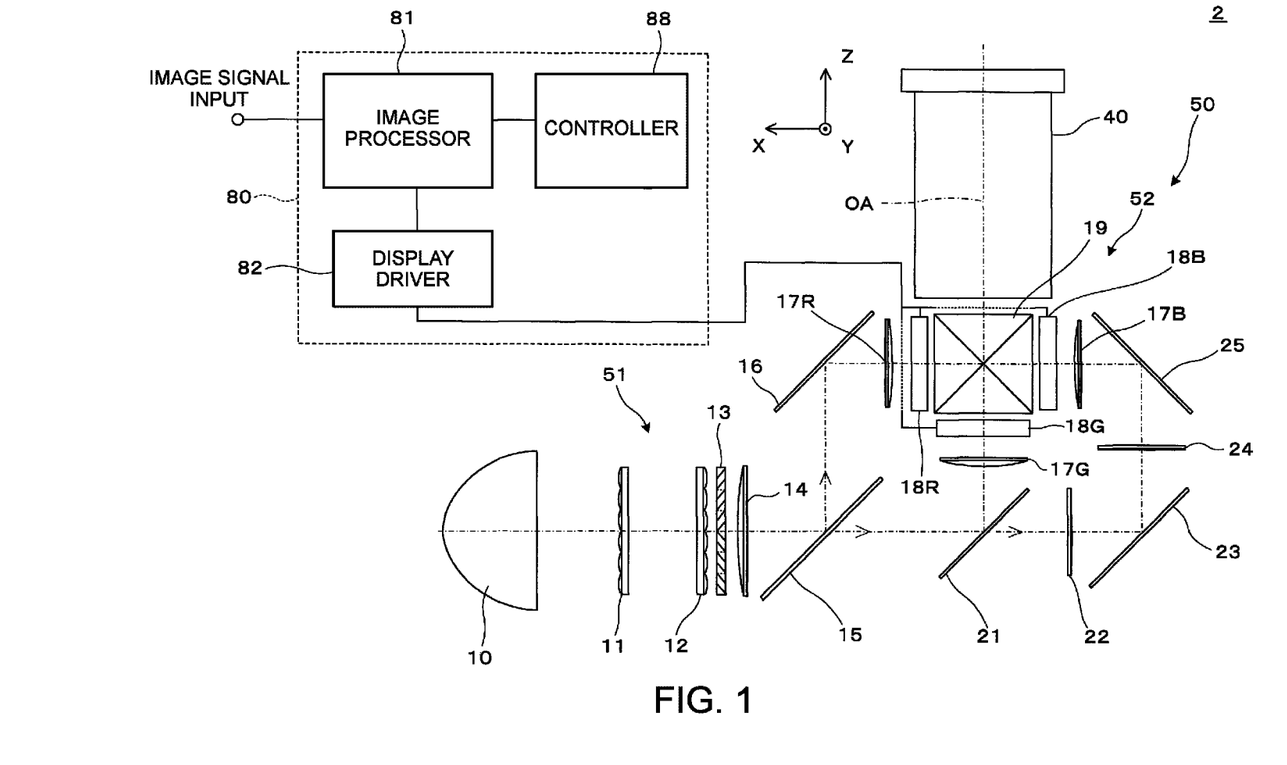
FIG. 1 shows a schematic configuration of a projector which incorporates a projection lens according to an embodiment.

A projector 2 as a projection-type image display apparatus which incorporates a projection lens according to an embodiment of the invention includes an optical system section 50, which projects image light, and a circuit apparatus 80, which controls the action of the optical system section 50, as shown in FIG. 1.

In the optical system section 50, a light source 10 is formed, for example, of an ultrahigh-pressure mercury lamp. A first optical integration lens 11 and a second optical integration lens 12 each have a plurality of arrayed lens elements. The first optical integration lens 11 divides a light flux from the light source 10 into a plurality of light fluxes. Each of the lens elements of the first optical integration lens 11 focuses the plurality of divided light fluxes in the vicinity of the corresponding lens element of the second optical integration lens 12. The lens elements of the second optical integration lens 12, which cooperates with a superimposing lens 14, form images of the lens elements of the first optical integration lens 11 in the positions of liquid crystal panels 18R, 18G, and 18B, which will be described later.

A polarization conversion element 13 converts the light from the second optical integration lens 12 into predetermined linearly polarized light. The superimposing lens 14 superimposes, in cooperation with the second optical integration lens 12, the images of the lens elements of the first optical integration lens 11 on one another on display areas of the liquid crystal panels 18R, 18G, and 18B. The liquid crystal panels 18R, 18G, and 18B are thus uniformly illuminated.

A first dichroic mirror 15 reflects red light and transmits green light and blue light incident thereon from the superimposing lens 14. The red light reflected off the first dichroic mirror 15 travels along a reflection mirror 16 and a field lens 17R and impinges on the liquid crystal panel 18R, which is a light modulation device or a display device. The liquid crystal panel 18R modulates the red light in accordance with an image signal to form a red image.

A second dichroic mirror 21 reflects the green light and transmits the blue light having passed through the first dichroic mirror 15. The green light reflected off the second dichroic mirror 21 passes through a field lens 17G and impinges on the liquid crystal panel 18G, which is a display device. The liquid crystal panel 18G modulates the green light in accordance with an image signal to form a green image. The blue light having passed through the second dichroic mirror 21 travels along a relay lens 22, a relay lens 24, a reflection mirror 23, a reflection mirror 25, and a field lens 17B and impinges on the liquid crystal panel 18B, which is a display device. The liquid crystal panel 18B modulates the blue light in accordance with an image signal to form a blue image.

Across dichroic prism 19, which is a light combining prism, combines the light fluxes modulated by the liquid crystal panels 18R, 18G, and 18B into image light and directs the image light to a projection system 40.

The projection system 40 enlarges and projects the combined image light from the cross dichroic prism 19 on a screen that is not shown.

In the optical system section 50 described above, the section including the cross dichroic prism 19 as well as the projection system 40 is also called a projection system for enlarging and projecting images formed by the liquid crystal panels 18R, 18G, and 18B on the screen. The liquid crystal panels 18G, 18R, and 18B, the dichroic mirrors 15 and 21, the polarization conversion element 13, the optical integration lenses 11 and 12, the light source 10, and other components provided along the optical path upstream of the cross dichroic prism 19 function as an image formation optical section 51.

The circuit apparatus 80 includes an image processor 81, to which an external image signal, such as a video signal, is inputted, a display driver 82, which drives the liquid crystal panels 18G, 18R, and 18B provided in the optical system section 50 on the basis of an output from the image processor 81, and a primary controller 88, which oversees and controls the action of the image processor 81 and the display driver 82.

The image processor 81 converts the inputted external image signal into an image signal containing grayscales and other parameters for each of the colors. The image processor 81 can also perform distortion correction, color correction, and a variety of other types of image processing on the external image signal.

The display driver 82 operates the liquid crystal panels 18G, 18R, and 18B on the basis of the image signal outputted from the image processor 81 to allow the liquid crystal panels 18G, 18R, and 18B to form images corresponding to the image signal.

The projection system 40 according to the embodiment of the invention will be specifically described below with reference to FIG. 2. The projection system 40 illustrated as the embodiment has the same configuration as that of a projection lens according to Example 1, which will be described later.

The projection system 40 projects an image formed on the liquid crystal panel 18G (18R, 18B) on the screen that is not shown. A prism PR, which corresponds to the cross dichroic prism 19 shown in FIG. 1, is disposed between the projection system 40 and the liquid crystal panel 18G (18R, 18B).

The projection system 40 according to the embodiment is formed of a first lens group G1 to a sixth lens group G6 sequentially arranged from a enlargement side or a screen side. That is, in the projection system 40 according to the present embodiment, the number n of groups is six or a six-group configuration is employed. When the magnification is changed, the first lens group G1, which is closest to the enlargement side, and the sixth lens group G6, which is closest to the reduction side, are fixed, and the second lens group G2 to the fifth lens group G5 are moved along an optical axis OA. The zooming ratio over a magnification change range from a wide angle end to a telescopic end is 1.4. The first lens group G1, which is closest to the enlargement side, includes a first-first lens group G1-1 and a first-second lens group G1-2 sequentially arranged from the enlargement side. The first lens group G1 is moved along the optical axis OA when focus adjustment is performed. In the first lens group G1, the distance between the first-first lens group G1-1 and the first-second lens group G1-2 is configured to be variable for image plane correction. Specifically, the entire first lens group G1 is moved along the optical axis OA for focus adjustment, and the first-first lens group G1-1 is, for example, displaced at the same time in parallel to the optical axis OA relative to the first-second lens group G1-2. In this process, moving the first-first lens group G1-1 and the first-second lens group G1-2 in cooperation with each other allows the focus adjustment and the image plane adjustment to be simultaneously performed. Instead, the first-second lens group G1-2 may first be moved along the optical axis to bring a central portion of an image into focus, the first-first lens group G1-1 may then be moved along the optical axis to adjust the image plane at the periphery of the image.

To move the second lens group G2 to the fifth lens group G5 when the magnification is changed, a cam mechanism or any other cooperative movement mechanism is incorporated in a barrel of the projection system 40. The cooperative movement mechanism for magnification change can be manually operated or motorized. Further, to move the first-first lens group G1-1 and the first-second lens group G1-2 when focus adjustment is performed, a drive mechanism including a helicoid, a cam mechanism, and other components is incorporated in the barrel of the projection system 40. The drive mechanism can be manually operated or motorized.

The first lens group G1 to the sixth lens group G6, which form the projection system 40, have no bonded surface but are formed of single lenses. The projection system 40, when it is formed of single lenses as described above, can be adapted to an illumination system having an illuminance of at least 10,000 lumens. In the first-first lens group G1-1, a lens L1, which is located in a position closest to the enlargement side, is a positive lens, and a lens L2, which is located in the second position counted from the enlargement side, is a negative lens. The lens L2, which is located in the second position counted from the enlargement side, is made of a resin material and is an aspheric lens having aspheric surfaces on both sides. The first lens group G1 includes three negative spherical lenses adjacent to each other. On the other hand, the fifth lens group G5, which is located in the second position counted from the position closest to the reduction side, is formed of a positive first lens L15, a negative second lens L16, and a positive third lens L17 for reduction in the amounts of a variety of aberrations.

The projection system 40 according to the embodiment satisfies the following conditional expression (1):

$$2<BF/fw<2.8 \tag{1}$$

where fw represents the focal length at the wide angle end, and BF represents the air conversion length of the back focal distance.

In this case, a half field angle ranging from about 35° to 45° can be provided.

The projection system 40 according to the embodiment further satisfies the following conditional expression (2)':

$$|f5/fw|>5 \tag{2}'$$

where f(n−1)=f5 represents the focal length of the fifth lens group G5. The projection system 40 according to the embodiment further satisfies the following conditional expressions (3) and (4):

$$vdf1-vdf2>20 \tag{3}$$

$$vdf3-vdf2>20 \tag{4}$$

where vdf1 represents the Abbe number of the first lens L15 in the fifth lens group G5, vdf2 represents the Abbe number of the second lens L16 in the fifth lens group G5, and vdf3 represents the Abbe number of the third lens L17 in the fifth lens group G5.

In the fifth lens group G5 described above, the distance between the first lens L15 and the second lens L16 and the distance between the second L16 and the third lens L17 are each 3 mm or shorter.

In the projection system 40 according to the embodiment, the first lens group G1 includes three negative spherical lenses (specifically, lenses L2, L3, and L4) adjacent to each other. The first lens group G1 satisfies the following conditional expression (5):

$$vdN>60 \tag{5}$$

where vdN represents the Abbe number of the negative spherical lens closest to the reduction side among the three negative spherical lenses.

According to the projection system 40 of the present embodiment, since the value BF/fw in the conditional expression (1) falls within the range described above from 2 to 2.8, a half field angle ranging from about 35° to about 45° can be provided. Since the projection system 40 of the present embodiment is formed of the first lens group G1 to the sixth lens group G6, and the second lens group G2 to the fifth lens group G5 are moved, a relatively large zooming ratio can be provided. Further, since the distance between the first-first lens group G1-1 and the first-second lens group G1-2 is configured to be variable for image plane correction, the first-first lens group G1-1 is allowed to function as an image plane correction group, whereby shift of the image plane can be suppressed when the size of an image is changed, and precise image projection is therefore achieved.

EXAMPLES

Specific examples of the projection system 40 will be described below. The meanings of a variety of parameters common to Examples 1 to 4 are summarized as follows.
 R: Radius of curvature
 D: On-axis inter-surface space (thickness of lens or space between lenses)
 nd: Refractive index at d line
 vd: Abbe number at d line
 OBJ: Distance to object
 A to F: Space between movable lenses
 SC: Screen
 ST: Fixed aperture
 L1 to L18: Lens
 DP: Component inserted on the rear side (such as prism)
 LV: Image formation plane of display device An aspheric surface, that is, the amount of sag z thereof is expressed by the following polynomial (expression of aspheric surface).

$$z = \frac{ch^2}{1 + \sqrt{1 - (k+1)c^2 h^2}} + A_4 h^4 + A_6 h^6 + A_8 h^8 + A_{10} h^{10} + A_{12} h^{12}$$

The parameters in the polynomial are as follows:
 c: Curvature (1/R)
 h: Height from optical axis
 k: Conic coefficient of aspheric surface
 Ai: Higher-order aspheric coefficient of aspheric surface Example 1

Table 1 shown below shows data on the lens surfaces of a projection lens according to Example 1. In Table 1 and other tables, "INF" stands for ∞.

TABLE 1

| Surface number | Element | Group | R | D | nd | vd |
|---|---|---|---|---|---|---|
| 0 | SC | | INF | OBJ | | |
| 1 | L1 | 1-1 | 335.376 | 9.076 | 1.51633 | 64.1 |
| 2 | | | 702.836 | 0.300 | | |
| 3 | L2 | | 105.439 | 5.000 | 1.53116 | 56.0 |
| 4 | | | 71.594 | A | | |
| 5 | L3 | 1-2 | 96.772 | 4.000 | 1.84666 | 23.8 |

TABLE 1-continued

| Surface number | Element | Group | R | D | nd | vd |
|---|---|---|---|---|---|---|
| 6 | | | 50.131 | 26.530 | | |
| 7 | L4 | | −1007.624 | 3.500 | 1.61800 | 63.4 |
| 8 | | | 86.200 | 19.498 | | |
| 9 | L5 | | −92.024 | 3.200 | 1.43700 | 95.1 |
| 10 | | | 242.950 | 9.337 | | |
| 11 | L6 | | −335.752 | 4.460 | 1.84666 | 23.8 |
| 12 | | | −205.384 | 1.000 | | |
| 13 | L7 | | 156.742 | 19.443 | 1.60342 | 38.0 |
| 14 | | | −153.835 | B | | |
| 15 | ST | 2 | INF | 35.276 | | |
| 16 | L8 | | 120.320 | 8.207 | 1.69895 | 30.1 |
| 17 | | | 373.545 | C | | |
| 18 | L9 | 3 | 105.477 | 6.767 | 1.48749 | 70.5 |
| 19 | | | −1968.326 | 9.253 | | |
| 20 | L10 | | 93.780 | 2.000 | 1.49700 | 81.5 |
| 21 | | | 57.203 | D | | |
| 22 | L11 | 4 | −60.940 | 2.600 | 1.90366 | 31.3 |
| 23 | | | 490.086 | 0.579 | | |
| 24 | L12 | | 190.114 | 12.575 | 1.80610 | 33.3 |
| 25 | | | −79.729 | 0.300 | | |
| 26 | L13 | | 1107.211 | 12.851 | 1.49700 | 81.5 |
| 27 | | | −56.674 | 2.473 | | |
| 28 | L14 | | −51.456 | 2.000 | 1.80610 | 33.3 |
| 29 | | | −87.986 | E | | |
| 30 | L15 | 5 | 176.144 | 14.894 | 1.43700 | 95.1 |
| 31 | | | −68.984 | 0.200 | | |
| 32 | L16 | | −80.185 | 2.800 | 1.80610 | 33.3 |
| 33 | | | 94.507 | 1.866 | | |
| 34 | L17 | | 104.788 | 13.954 | 1.43700 | 95.1 |
| 35 | | | −123.359 | F | | |
| 36 | L18 | 6 | 265.676 | 9.283 | 1.80809 | 22.8 |
| 37 | | | −244.816 | 10 | | |
| 38 | DP | | INF | 85 | 1.5168 | 64.2 |
| 39 | | | INF | 22.48 | | |
| 40 | LV | | INF | 0.00 | | |

Table 2 shown below shows aspheric coefficients of a third surface S3 and aspheric coefficients of a fourth surface S4 in Example 1. In following Table 2 and other tables, 10 raised to some power (3.16×10$^{-07}$, for example) is expressed by using E (3.16E-07, for example).

TABLE 2

| | Surface S3 | Surface S4 |
|---|---|---|
| Radius of curvature | 105.439 | 71.594 |
| Conic constant (K) | −1.002 | −0.335 |
| Fourth coefficient(A) | 3.16208E−07 | 1.19091E−07 |
| Sixth coefficient (B) | −2.27133E−11 | −7.86220E−11 |
| Eighth coefficient (C) | −3.23103E−15 | 3.06546E−14 |
| Tenth coefficient (D) | −2.20822E−19 | −2.93411E−17 |
| Twelfth coefficient (E) | 7.72160E−23 | 8.70986E−21 |
| Fourteenth coefficient (F) | −3.53694E−26 | −1.37616E−24 |
| Sixteenth coefficient (G) | 2.46508E−30 | 9.35687E−29 |
| Eighteenth coefficient (H) | 0.00000E+00 | 0.00000E+00 |
| Twentieth coefficient (J) | 0.00000E+00 | 0.00000E+00 |

Table 3 shown below summarizes basic performance of the projection system according to Example 1:

TABLE 3

|   | WIDE | TELE |
|---|---|---|
| f | 37.24 | 44.68 |
| Zooming ratio | 1.20 | |
| FNO | 2.39 | 2.61 |
| BF (in air) | 88.45 mm | |
| OBJ | 3.9 m | |
| Effective image diameter | φ62 | |
| ω | 40.0 | 35.0 |
| A | 12.92 | 12.92 |
| B | 107.89 | 71.33 |
| C | 23.34 | 35.37 |
| D | 13.67 | 16.07 |
| E | 0.80 | 3.13 |
| F | 20.70 | 40.50 |

The parameters in Table 3 described above are defined as follows: f means the focal length; FNO means the f-number; BFO means the back focal distance; and ω means the half field angle. The movable lens spaces A and B change when focusing operation is performed. The movable lens spaces B to F (C to F, in particular) change when zooming operation is performed.

Table 4 shown below describes setting of the movable lens spaces A and B in a case where the distance to an object is changed in the projection system according to Example 1.

TABLE 4

| Movement of groups in a case where distance to object is changed | OBJ = 3.9 m | OBJ = 1.95 m | OBJ = 10 m |
|---|---|---|---|
| A Amount of movement of image plane adjusting group | Reference | 2.06 | −1.32 |
| B Amount of movement of focusing group | Reference | 2.75 | −1.74 |

Figure 2:
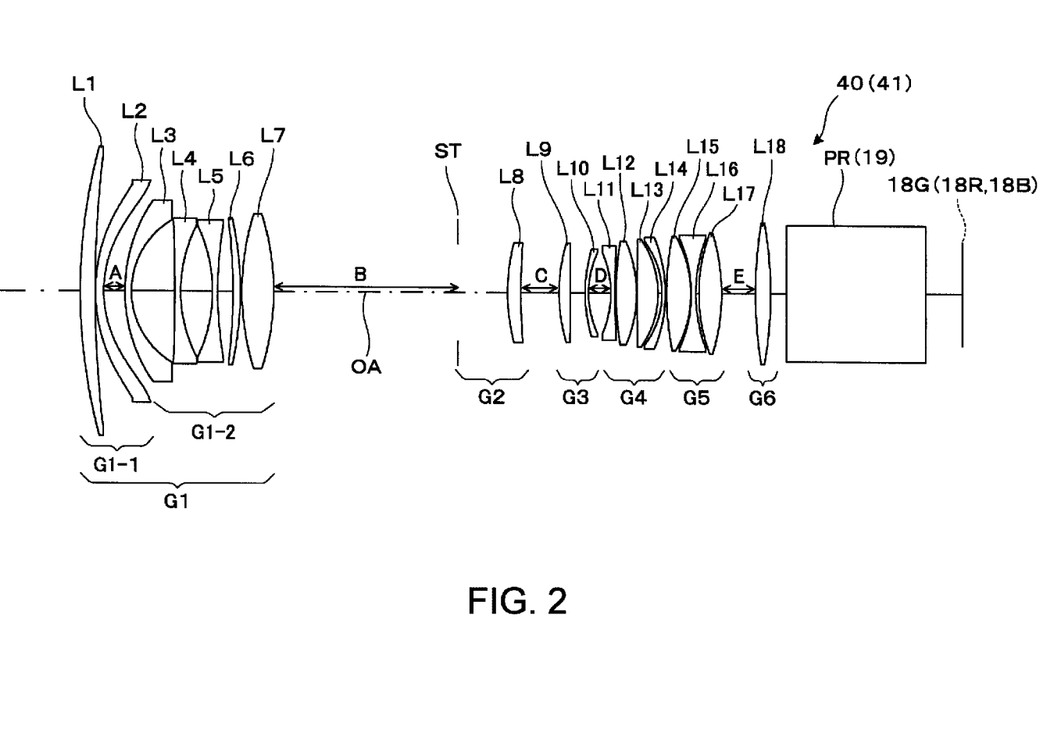
FIG. 2 is a cross-sectional view of a projection lens according to Example 1.

FIG. 2 is a cross-sectional view of a projection system 41 according to Example 1. The projection system 41 shown in FIG. 2 corresponds to the projection system 40 according to the embodiment. The projection system 41 enlarges and projects an image formed on the liquid crystal panel 18G (or liquid crystal panel 18R, 18B) and includes a first lens group G1 to a sixth lens group G6 sequentially arranged from the enlargement side. When the magnification is changed, the second lens group G2 to the fifth lens group G5 are moved along the optical axis OA, and when focus adjustment is performed, the first-first lens group G1-1 and the first-second lens group G1-2 are moved along the optical axis OA with the space therebetween adjusted.

In the projection system 41 described above, a first lens L1 is a positive meniscus lens having a convex surface facing the enlargement side, a second lens L2 is a negative meniscus lens having a convex surface facing the enlargement side, a third lens L3 is a negative meniscus lens having a convex surface facing the enlargement side, a fourth lens L4 is a biconcave lens, a fifth lens L5 is a biconcave lens, a sixth lens L6 is a positive meniscus lens having a convex surface facing the reduction side, and a seventh lens L7 is a biconvex lens. The lenses L1 to L7 described above form the first lens group G1. An eighth lens L8 is a positive meniscus lens having a convex surface facing the enlargement side, a ninth lens L9 is a biconvex lens close to a convex-plano lens, a tenth lens L10 is a negative meniscus lens having a convex surface facing the enlargement side, an eleventh lens L11 is a biconcave lens, a twelfth lens L12 is a biconvex lens, a thirteenth lens L13 is a biconvex lens, and a fourteenth lens L14 is a negative meniscus lens having a convex surface facing the reduction side. The following fifteenth to seventeenth lenses L15 to L17 form the fifth lens group G5. The fifteenth lens L15 is a biconvex lens, the sixteenth lens L16 is a biconcave lens, and the seventeenth lens L17 is a biconvex lens. An eighteenth lens L18 in the sixth lens group G6, which is closest to the reduction side, is a biconvex lens. An aperture ST is associated with the second lens group G2.

Figure 3A:
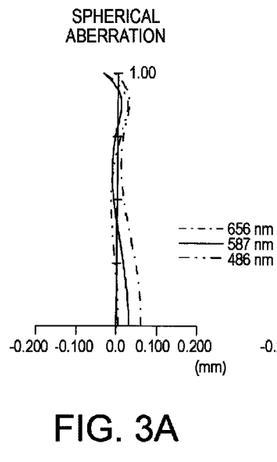
FIGS. 3A to 3C show aberrations produced by the projection lens according to Example 1 operating at a wide angle end.
Figure 3B:
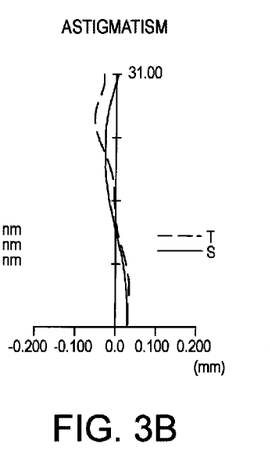
Figure 3C:
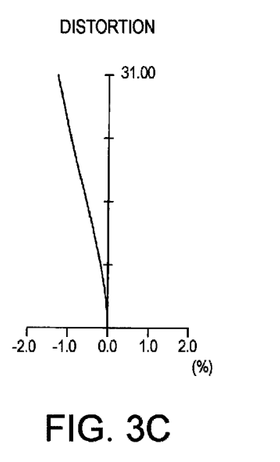
Figure 3D:
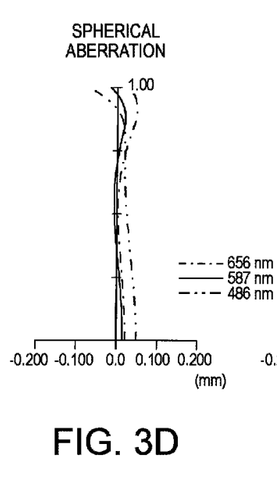
FIGS. 3D to 3F show aberrations produced by the projection lens according to Example 1 operating at a telescopic end.
Figure 3E:
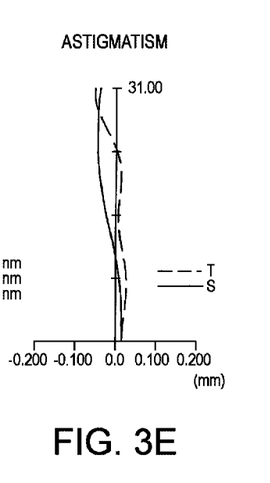
Figure 3F:
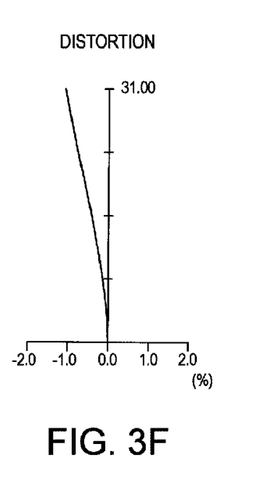

FIGS. 3A to 3C show reduction-side aberrations (spherical aberration, astigmatism, and distortion) produced by the projection system 41 according to Example 1 operating at the wide angle end. FIGS. 3D to 3F show the reduction-side aberrations produced by the projection system 41 operating at the telescopic end.

Example 2

Table 5 shown below shows data on the lens surfaces of a projection system according to Example 2.

TABLE 5

| Surface number | Element | Group | R | D | nd | vd |
|---|---|---|---|---|---|---|
| 0 | SC | | INF | OBJ | | |
| 1 | L1 | 1-1 | 348.903 | 9.831 | 1.51633 | 64.1 |
| 2 | | | 824.405 | 0.300 | | |
| 3 | L2 | | 115.496 | 5.000 | 1.53116 | 56.0 |
| 4 | | | 77.261 | A | | |
| 5 | L3 | 1-2 | 95.179 | 4.000 | 1.84666 | 23.8 |
| 6 | | | 50.328 | 23.665 | | |
| 7 | L4 | | 243.429 | 3.500 | 1.49700 | 81.5 |
| 8 | | | 66.732 | 21.269 | | |
| 9 | L5 | | −112.297 | 3.406 | 1.46700 | 81.5 |
| 10 | | | 122.340 | 0.300 | | |
| 11 | L6 | | 97.275 | 15.718 | 1.51633 | 64.1 |
| 12 | | | −1587.133 | B | | |
| 13 | L7 | 2 | 1045.186 | 9.462 | 1.84666 | 23.8 |
| 14 | | | −266.623 | C | | |
| 15 | L8 | 3 | 114.130 | 6.654 | 1.72342 | 38.0 |
| 16 | | | 193.518 | D | | |
| 17 | L9 | 4 | 107.363 | 11.867 | 1.48749 | 70.2 |
| 18 | | | −2063.836 | 9.461 | | |
| 19 | L10 | | 102.099 | 2.000 | 1.43700 | 95.1 |
| 20 | | | 60.410 | E | | |
| 21 | L11 | 5 | −61.405 | 2.600 | 1.90366 | 31.3 |
| 22 | | | 497.281 | 0.553 | | |
| 23 | L12 | | 191.826 | 12.598 | 1.80610 | 33.3 |
| 24 | | | −81.723 | 0.300 | | |
| 25 | L13 | | 576.709 | 12.884 | 1.49700 | 81.5 |
| 26 | | | −60.667 | 2.348 | | |
| 27 | L14 | | −55.506 | 2.000 | 1.80610 | 33.3 |
| 28 | | | −90.596 | F | | |
| 29 | L15 | 6 | 149.435 | 15.037 | 1.43700 | 95.1 |
| 30 | | | −75.273 | 0.705 | | |
| 31 | L16 | | −80.930 | 2.800 | 1.80610 | 33.3 |
| 32 | | | 93.487 | 1.707 | | |
| 33 | L17 | | 101.035 | 15.272 | 1.43700 | 95.1 |
| 34 | | | −116.868 | G | | |
| 35 | L18 | 7 | 229.335 | 8.800 | 1.80809 | 22.8 |
| 36 | | | −334.289 | 10.000 | | |
| 37 | DP | | INF | 80.000 | 1.5168 | 64.2 |
| 38 | | | INF | 22.673 | | |
| 40 | LV | | INF | 0 | | |

Table 6 shown below shows aspheric coefficients of a third surface S3 and aspheric coefficients of a fourth surface S4 in Example 2.

TABLE 6

| | Surface S3 | Surface S4 |
|---|---|---|
| Radius of curvature | 115.496 | 77.261 |
| Conic constant (K) | −0.922 | −0.482 |
| Fourth coefficient (A) | 3.43180E−07 | 2.22953E−07 |
| Sixth coefficient (B) | −3.42135E−11 | −9.09683E−11 |
| Eighth coefficient (C) | −1.99977E−15 | 3.44928E−14 |
| Tenth coefficient (D) | −5.61782E−19 | −2.86408E−17 |
| Twelfth coefficient (E) | 2.58965E−22 | 8.87723E−21 |
| Fourteenth coefficient (F) | −6.22135E−26 | −1.40945E−24 |
| Sixteenth coefficient (G) | 3.89558E−30 | 9.21829E−29 |
| Eighteenth coefficient (H) | 0.00000E+00 | 0.00000E+00 |
| Twentieth coefficient (J) | 0.00000E+00 | 0.00000E+00 |

Table 7 shown below summarizes basic performance of the projection system according to Example 2.

TABLE 7

| Element | WIDE | TELE |
|---|---|---|
| f | 36.97 | 51.76 |
| Zooming ratio | | 1.40 |
| FNO | 2.36 | 2.81 |
| BF (in air) | | 88.45 mm |
| OBJ | | 3.8 m |
| Effective image diameter | | ϕ66 |
| ω | 42.1 | 32.8 |
| A | 10.44 | 10.44 |
| B | 60.34 | 51.56 |
| C | 87.99 | 20.13 |
| D | 25.24 | 49.46 |
| E | 25.45 | 29.72 |
| F | 0.80 | 16.57 |
| G | 20.74 | 53.12 |

In Table 7 described above, the movable lens spaces A and B change when focusing operation is performed. The movable lens spaces B to F (C to G, in particular) change when zooming operation is performed.

The Table 8 shown below describes setting of the movable lens spaces A and B in a case where the distance to an object is changed in the projection system according to Example 2.

TABLE 8

| Movement of groups in a case where distance to object is changed | OBJ = 3.8 m | OBJ = 1.95 m | OBJ = 9 m |
|---|---|---|---|
| A Amount of movement of image plane adjusting group | Reference | 1.68 | −1.04 |
| B Amount of movement of focusing group | Reference | 0.63 | −0.36 |

Figure 4:
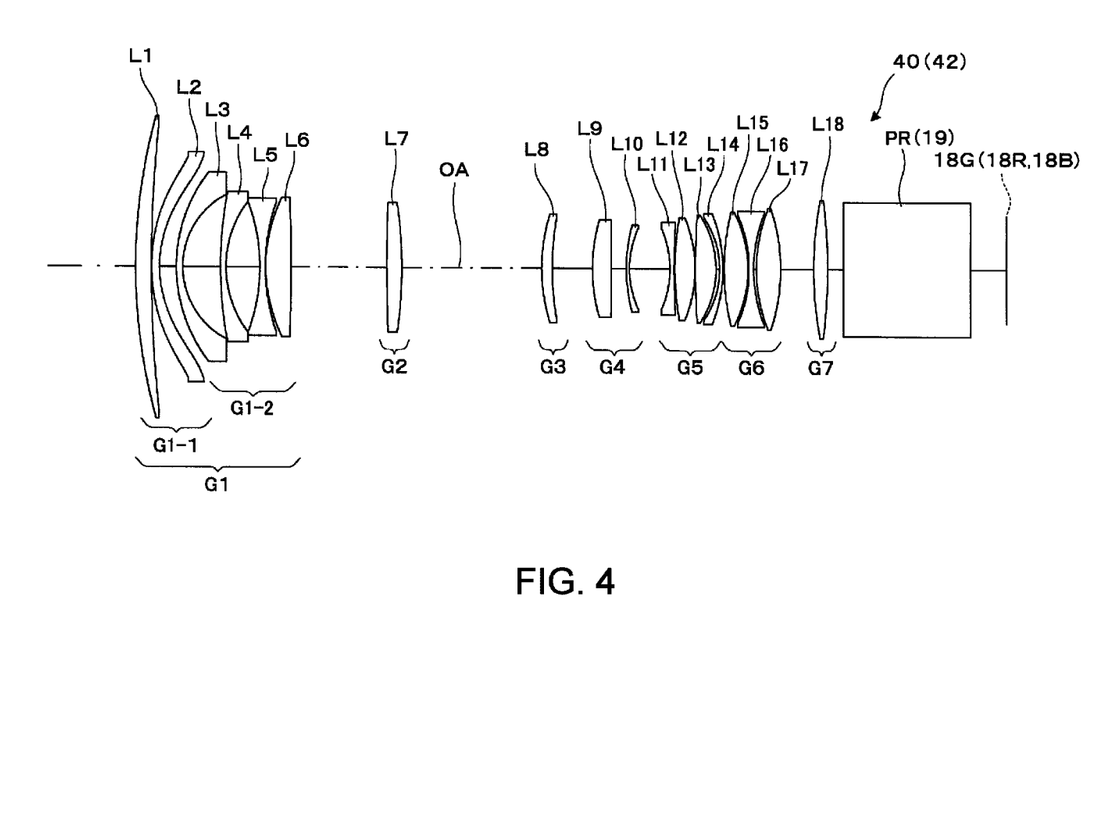
FIG. 4 is a cross-sectional view of a projection lens according to Example 2.

FIG. 4 is a cross-sectional view of a projection system 42 according to Example 2. The projection system 42 enlarges and projects an image formed on the liquid crystal panel 18G (or liquid crystal panel 18R, 18B) and includes a first lens group G1 to a seventh lens group G7 sequentially arranged from the enlargement side. When the magnification is changed, the second lens group G2 to the sixth lens group G6 are moved along the optical axis OA, and when focus adjustment is performed, the first-first lens group G1-1 and the first-second lens group G1-2 are moved along the optical axis OA with the space therebetween adjusted.

In the projection system 42 described above, a first lens L1 is a positive meniscus lens having a convex surface facing the enlargement side, a second lens L2 is a negative meniscus lens having a convex surface facing the enlargement side, a third lens L3 is a negative meniscus lens having a convex surface facing the enlargement side, a fourth lens L4 is a negative meniscus lens having a convex surface facing the enlargement side, a fifth lens L5 is a biconcave lens, and a sixth lens L6 is a biconvex lens. The lenses L1 to L6 described above form the first lens group G1. A seventh lens L7 is a biconvex lens, an eighth lens L8 is a positive meniscus lens having a convex surface facing the enlargement side, a ninth lens L9 is a biconvex lens close to a convex-plano lens, a tenth lens L10 is a negative meniscus lens having a convex surface facing the enlargement side, an eleventh lens L11 is a biconcave lens, a twelfth lens L12 is a biconvex lens, a thirteenth lens L13 is a biconvex lens, and a fourteenth lens L14 is a negative meniscus lens having a convex surface facing the reduction side. The following fifteenth to seventeenth lenses L15 to L17 form the sixth lens group G6. The fifteenth lens L15 is a biconvex lens, the sixteenth lens L16 is a biconcave lens, and the seventeenth lens L17 is a biconvex lens. An eighteenth lens L18 in the seventh lens group G7, which is closest to the reduction side, is a biconvex lens. An aperture ST is associated with the fourth lens group G4.

Figures 5A, 5B:
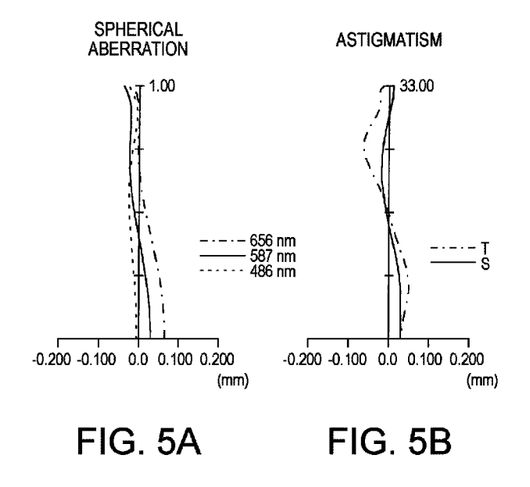
FIGS. 5A to 5C show aberrations produced by the projection lens according to Example 2 operating at the wide angle end.
Figure 5C:
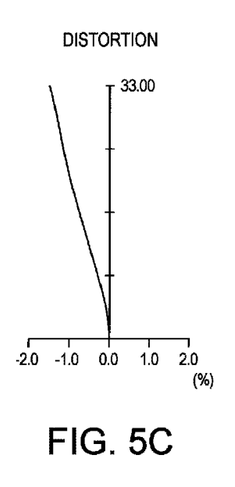
Figures 5D, 5E:
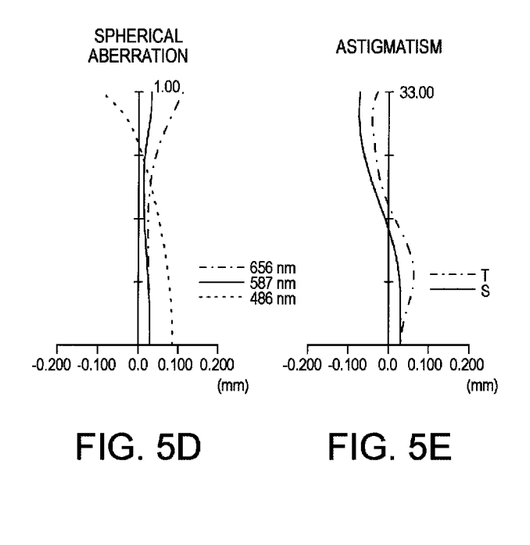
FIGS. 5D to 5F show aberrations produced by the projection lens according to Example 2 operating at the telescopic end.
Figure 5F:
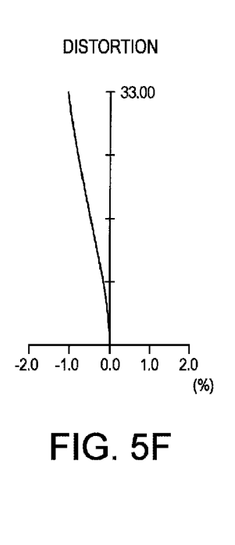

FIGS. 5A to 5C show reduction-side aberrations (spherical aberration, astigmatism, and distortion) produced by the projection system 42 according to Example 2 operating at the wide angle end. FIGS. 5D to 5F show the reduction-side aberrations produced by the projection system 42 operating at the telescopic end.

Example 3

Table 9 shown below shows data on the lens surfaces of a projection system according to Example 3.

TABLE 9

| Surface number | Element | Group | R | D | nd | νd |
|---|---|---|---|---|---|---|
| 0 | SC | | INF | OBJ | | |
| 1 | L1 | 1-1 | 297.830 | 10.380 | 1.51633 | 64.1 |
| 2 | | | 663.962 | 0.300 | | |
| 3 | L2 | | 108.947 | 5.000 | 1.53116 | 56.0 |
| 4 | | | 73.023 | A | | |
| 5 | L3 | 1-2 | 92.520 | 4.000 | 1.84666 | 23.8 |
| 6 | | | 48.907 | 26.925 | | |
| 7 | L4 | | −787.282 | 3.500 | 1.61800 | 63.4 |
| 8 | | | 83.701 | 19.151 | | |
| 9 | L5 | | −90.457 | 5.000 | 1.43700 | 95.1 |
| 10 | | | 337.199 | B | | |
| 11 | L6 | 2 | −161.908 | 4.209 | 1.84666 | 23.8 |
| 12 | | | −130.190 | 1.000 | | |
| 13 | L7 | | 163.938 | 18.583 | 1.60342 | 38.0 |
| 14 | | | −157.341 | C | | |
| 15 | ST | 3 | INF | 33.165 | | |
| 16 | L8 | | 110.404 | 12.371 | 1.69895 | 30.1 |
| 17 | | | 283.989 | D | | |
| 18 | L9 | 4 | 115.391 | 6.840 | 1.48749 | 70.2 |
| 19 | | | −622.821 | 11.851 | | |
| 20 | L10 | | 84.293 | 2.000 | 1.49700 | 81.5 |
| 21 | | | 53.174 | E | | |
| 22 | L11 | 5 | −62.455 | 2.600 | 1.90366 | 31.3 |
| 23 | | | 452.216 | 0.697 | | |
| 24 | L12 | | 189.917 | 11.698 | 1.80610 | 33.3 |
| 25 | | | −87.632 | 0.300 | | |

TABLE 9-continued

| Surface number | Element | Group | R | D | nd | vd |
|---|---|---|---|---|---|---|
| 26 | L13 | | 1539.784 | 12.958 | 1.49700 | 81.5 |
| 27 | | | −53.178 | 2.360 | | |
| 28 | L14 | | −48.798 | 2.000 | 1.80610 | 33.3 |
| 29 | | | −87.500 | F | | |
| 30 | L15 | 6 | 164.109 | 15.195 | 1.43700 | 95.1 |
| 31 | | | −68.983 | 0.200 | | |
| 32 | L16 | | −87.051 | 2.800 | 1.80610 | 33.3 |
| 33 | | | 94.468 | 1.804 | | |
| 34 | L17 | | 103.824 | 14.163 | 1.43700 | 95.1 |
| 35 | | | −121.317 | G | | |
| 36 | L18 | 7 | 218.322 | 9.674 | 1.80809 | 22.8 |
| 37 | DP | | −288.927 | 10.000 | | |
| 38 | | | INF | 80.000 | 1.5168 | 64.2 |
| 39 | LV | | INF | 22.691 | | |

Table 10 shown below shows aspheric coefficients of a third surface S3 and aspheric coefficients of a fourth surface S4 in Example 3.

TABLE 10

| | Surface S3 | Surface S4 |
|---|---|---|
| Radius of curvature | 108.947 | 73.023 |
| Conic constant (K) | −0.692 | −0.438 |
| Fourth coefficient(A) | 3.46913E−07 | 2.49771E−07 |
| Sixth coefficient (B) | −2.09957E−11 | −6.33341E−11 |
| Eighth coefficient (C) | −1.69093E−15 | 3.55868E−14 |
| Tenth coefficient (D) | −7.73283E−19 | −2.99827E−17 |
| Twelfth coefficient (E) | 1.90207E−22 | 8.48660E−21 |
| Fourteenth coefficient (F) | −6.26777E−26 | −1.45275E−24 |
| Sixteenth coefficient (G) | 4.99264E−30 | 1.15164E−28 |
| Eighteenth coefficient (H) | 0.00000E+00 | 0.00000E+00 |
| Twentieth coefficient (J) | 0.00000E+00 | 0.00000E+00 |

Table 11 shown below summarizes basic performance of the projection system according to Example 3:

TABLE 11

| Element | WIDE | TELE |
|---|---|---|
| f | 37.25 | 44.72 |
| Zooming ratio | 1.20 | |
| FNO | 2.39 | 2.60 |
| BF (in air) | 85.43 mm | |
| OBJ | 3.9 m | |
| Effective image diameter | φ66 | |
| ω | 41.8 | 36.7 |
| A | 12.552 | 12.552 |
| B | 11.152 | 11.199 |
| C | 107.537 | 70.206 |
| D | 17.190 | 30.394 |
| E | 13.775 | 14.967 |
| F | 0.800 | 3.784 |
| G | 22.697 | 42.600 |

In Table 11 described above, the movable lens spaces A and B change when focusing operation is performed. The movable lens spaces B to F (C to F, in particular) change when zooming operation is performed.

Table 12 shown below describes setting of the movable lens spaces A and B in a case where the distance to an object is changed in the projection system according to Example 3.

TABLE 12

| Movement of groups in a case where distance to object is changed | OBJ = 3.9 m | OBJ = 1.95 m | OBJ = 10 m |
|---|---|---|---|
| A Amount of movement of image plane adjusting group | Reference | 1.33 | −0.97 |
| B Amount of movement of focusing group | Reference | 0.27 | −0.16 |

Figure 6:
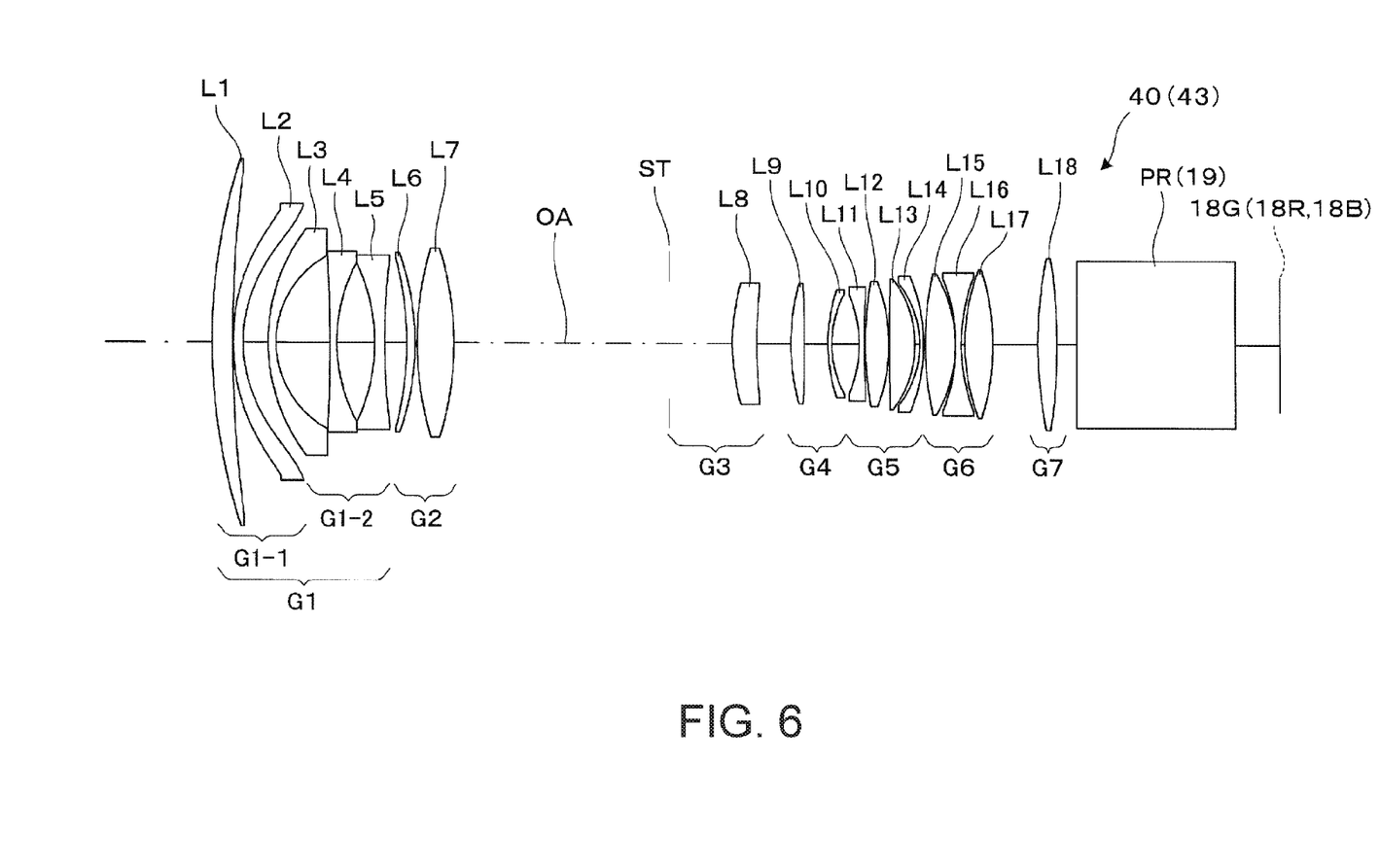
FIG. 6 is a cross-sectional view of a projection lens according to Example 3.

FIG. 6 is a cross-sectional view of a projection system 43 according to Example 3. The projection system 43 enlarges and projects an image formed on the liquid crystal panel 18G (liquid crystal panel 18R, 18B) and includes a first lens group G1 to a seventh lens group G7 sequentially arranged from the enlargement side. When the magnification is changed, the second lens group G2 to the sixth lens group G6 are moved along the optical axis OA, and when focus adjustment is performed, the first-first lens group G1-1 and the first-second lens group G1-2 are moved along the optical axis OA with the space therebetween adjusted.

In the projection system 43 described above, a first lens L1 is a positive meniscus lens having a convex surface facing the enlargement side, a second lens L2 is a negative meniscus lens having a convex surface facing the enlargement side, a third lens L3 is a negative meniscus lens having a convex surface facing the enlargement side, a fourth lens L4 is a biconcave lens, a fifth lens L5 is a biconcave lens, a sixth lens L6 is a positive meniscus lens having a convex surface facing the reduction side, and a seventh lens L7 is a biconvex lens. The lenses L1 to L7 described above form the first lens group G1. An eighth lens L8 is a positive meniscus lens having a convex surface facing the enlargement side, a ninth lens L9 is a biconvex lens, a tenth lens L10 is a negative meniscus lens having a convex surface facing the enlargement side, an eleventh lens L11 is a biconcave lens, a twelfth lens L12 is a biconvex lens, a thirteenth lens L13 is a biconvex lens, and a fourteenth lens L14 is a negative meniscus lens having a convex surface facing the reduction side. The following fifteenth to seventeenth lenses L15 to L17 form the sixth lens group G6. The fifteenth lens L15 is a biconvex lens, the sixteenth lens L16 is a biconcave lens, and the seventeenth lens L17 is a biconvex lens. An eighteenth lens L18 in the seventh lens group G7, which is closest to the reduction side, is a biconvex lens. An aperture ST is associated with the third lens group G3.

Figure 7A:
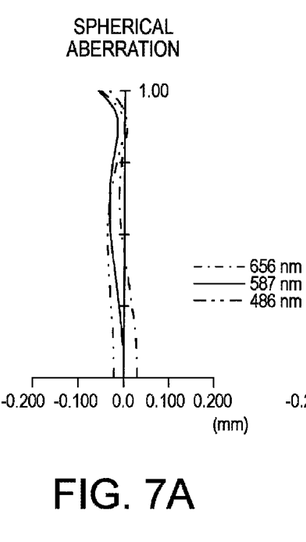
FIGS. 7A to 7C show aberrations produced by the projection lens according to Example 3 operating at the wide angle end.
Figure 7B:
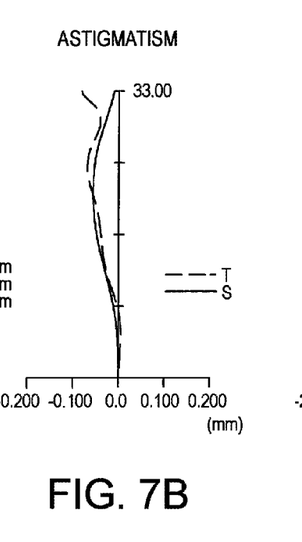
Figure 7C:
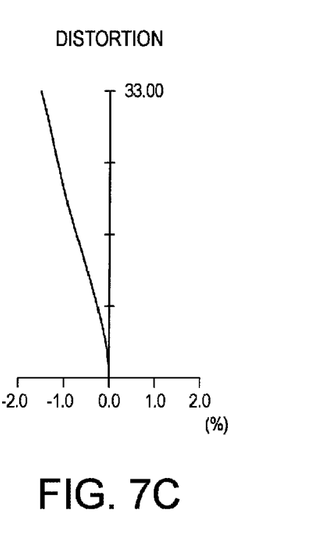
Figure 7D:
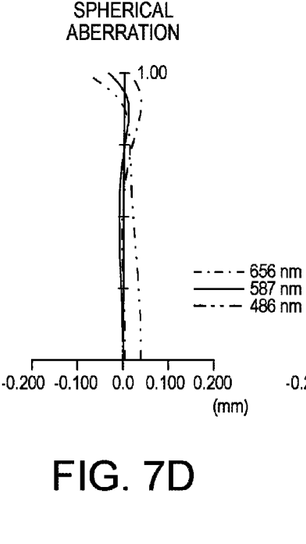
FIGS. 7D to 7F show aberrations produced by the projection lens according to Example 3 operating at the telescopic end.
Figure 7E:
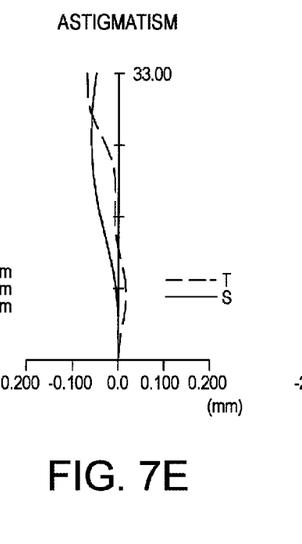
Figure 7F:
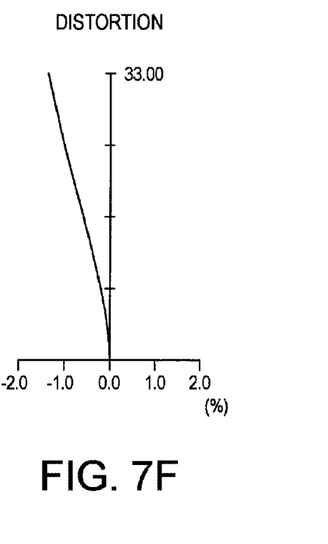

FIGS. 7A to 7C show reduction-side aberrations (spherical aberration, astigmatism, and distortion) produced by the projection system 43 according to Example 3 operating at the wide angle end. FIGS. 7D to 7F show the reduction-side aberrations produced by the projection system 43 operating at the telescopic end.

Example 4

Table 13 shown below shows data on the lens surfaces of a projection system according to Example 4.

TABLE 13

| Surface number | Element | Group | R | D | nd | vd |
|---|---|---|---|---|---|---|
| 0 | SC | | INF | OBJ | | |
| 1 | L1 | 1-1 | 308.288 | 10.321 | 1.51633 | 64.1 |
| 2 | | | 784.171 | 0.300 | | |
| 3 | L2 | | 105.870 | 5.000 | 1.53116 | 56.0 |
| 4 | | | 70.725 | A | | |
| 5 | L3 | 1-2 | 89.839 | 4.000 | 1.80518 | 25.46 |
| 6 | | | 47.932 | 20.350 | | |
| 7 | L4 | | 206.978 | 3.500 | 1.62299 | 58.12 |
| 8 | | | 66.313 | 21.122 | | |
| 9 | L5 | | −81.016 | 5.000 | 1.497 | 81.54 |
| 10 | | | 190.501 | 17.425 | | |
| 11 | L6 | | 211.197 | 18.846 | 1.59551 | 39.22 |
| 12 | | | −107.120 | B | | |
| 13 | L7 | 2 | 113.357 | 4.985 | 1.84666 | 23.78 |
| 14 | | | 187.335 | C | | |
| 15 | ST | 3 | INF | 5.000 | | |
| 16 | L8 | | 92.384 | 3.844 | 1.48749 | 70.23 |
| 17 | | | 187.440 | D | | |
| 18 | L9 | 4 | −169.646 | 6.412 | 1.48749 | 70.23 |
| 19 | | | −60.995 | 2.293 | | |
| 20 | L10 | | −56.482 | 2.600 | 1.8061 | 33.27 |
| 21 | | | 161.785 | 1.670 | | |
| 22 | L11 | | 132.347 | 11.863 | 1.8061 | 33.27 |
| 23 | | | −99.210 | 23.140 | | |
| 24 | L12 | | 171.455 | 15.592 | 1.497 | 81.54 |
| 25 | | | −63.490 | 2.198 | | |
| 26 | L13 | | −58.089 | 2.000 | 1.8061 | 33.27 |
| 27 | | | −134.958 | E | | |
| 28 | L14 | 5 | 332.428 | 13.473 | 1.48749 | 70.23 |
| 29 | | | −72.470 | 0.200 | | |
| 30 | L15 | | −82.011 | 2.800 | 1.8061 | 33.27 |
| 31 | | | 85.820 | 1.789 | | |
| 32 | L16 | | 93.620 | 13.090 | 1.497 | 81.54 |
| 33 | | | −225.210 | F | | |
| 34 | L17 | 6 | 148.929 | 10.391 | 1.84666 | 23.78 |
| 35 | DP | | −406.462 | 10.000 | | |
| 36 | | | INF | 66.000 | 1.5168 | 64.2 |
| 39 | LV | | INF | 23.000 | | |

Table 14 shown below shows aspheric coefficients of a third surface S3 and aspheric coefficients of a fourth surface S4 in Example 4.

TABLE 14

| | Surface S3 | Surface S4 |
|---|---|---|
| Radius of curvature | 105.870 | 70.725 |
| Conic constant (K) | −0.359 | −0.436 |
| Fourth coefficient (A) | 4.31358E−07 | 3.75384E−07 |
| Sixth coefficient (B) | −5.25336E−11 | −1.02383E−10 |
| Eighth coefficient (C) | −3.15480E−15 | 2.70128E−14 |
| Tenth coefficient (D) | −5.85567E−19 | −3.13601E−17 |
| Twelfth coefficient (E) | 1.67212E−22 | 8.61565E−21 |
| Fourteenth coefficient (F) | −8.08883E−26 | −1.31064E−24 |
| Sixteenth coefficient (G) | 7.51322E−30 | 9.94791E−29 |
| Eighteenth coefficient (H) | 0.00000E+00 | 0.00000E+00 |
| Twentieth coefficient (J) | 0.00000E+00 | 0.00000E+00 |

Table 15 shown below summarizes basic performance of the projection system according to Example 5.

TABLE 15

| Element | WIDE | TELE |
|---|---|---|
| f | 36.88 | 44.99 |
| Zooming ratio | 1.22 | |
| FNO | 2.28 | 2.53 |
| BF (in air) | 76.524 mm | |
| OBJ | 3.8 m | |
| Effective image diameter | φ64 | |
| ω | 41.0 | 35.6 |
| A | 12.41 | 12.41 |
| B | 62.12 | 23.86 |
| C | 68.80 | 74.32 |
| D | 5.79 | 15.89 |
| E | 0.80 | 10.14 |
| F | 17.41 | 30.71 |

In Table 15 described above, the movable lens spaces A and B change when focusing operation is performed. The movable lens spaces B to F (C to F, in particular) change when zooming operation is performed.

Table 16 shown below describes setting of the movable lens spaces A and B in a case where the distance to an object is changed in the projection system according to Example 4.

TABLE 16

| Movement of groups in a case where distance to object is changed | | OBJ = 3.8 m | OBJ = 1.95 m | OBJ = 9 m |
|---|---|---|---|---|
| A | Amount of movement of image plane adjusting group | | 2.27 | −1.38 |
| B | Amount of movement of focusing group | | 2.19 | −1.34 |

Figure 8:
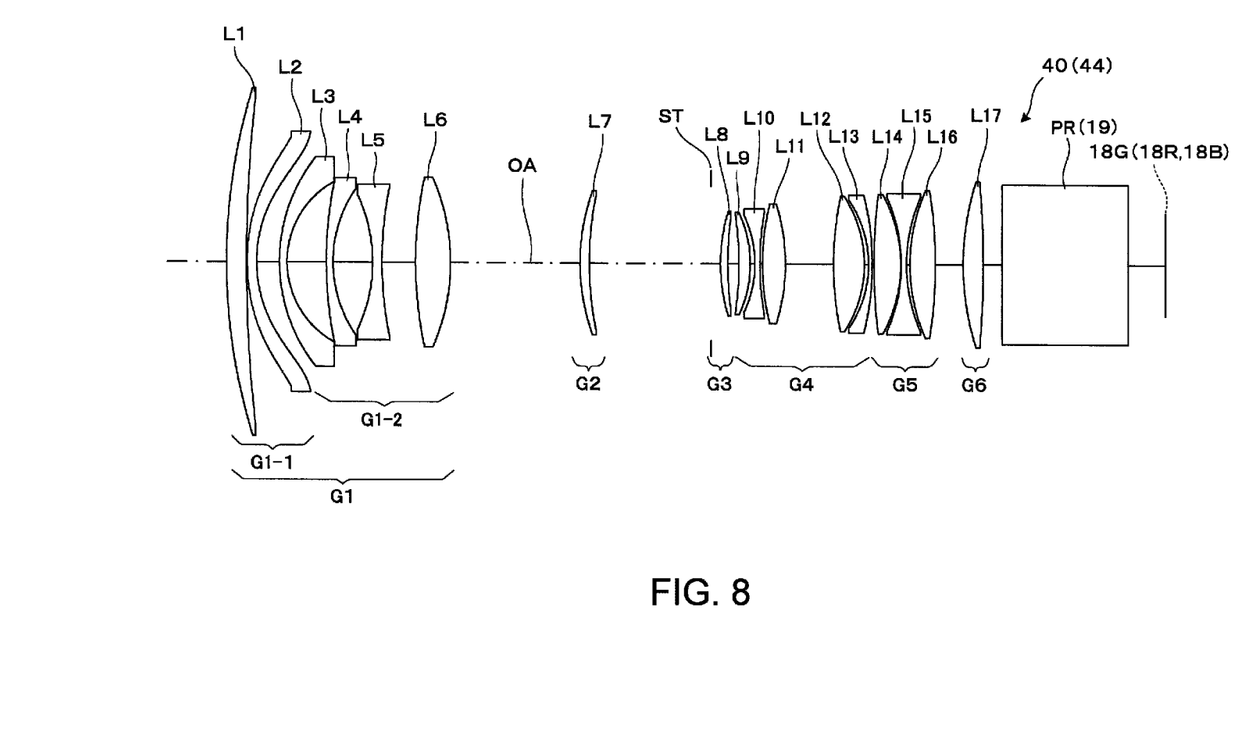
FIG. 8 is a cross-sectional view of a projection lens according to Example 4.

FIG. 8 is a cross-sectional view of a projection system 44 according to Example 4. The projection system 44 enlarges and projects an image formed on the liquid crystal panel 18G (liquid crystal panel 18R, 18B) and includes a first lens group G1 to a sixth lens group G6 sequentially arranged from the enlargement side. When the magnification is changed, the second lens group G2 to the fifth lens group G5 are moved along the optical axis OA, and when focus adjustment is performed, the first-first lens group G1-1 and the first-second lens group G1-2 are moved along the optical axis OA with the space therebetween adjusted.

In the projection system 44 described above, a first lens L1 is a positive meniscus lens having a convex surface facing the enlargement side, a second lens L2 is a negative meniscus lens having a convex surface facing the enlargement side, a third lens L3 is a negative meniscus lens having a convex surface facing the enlargement side, a fourth lens L4 is a biconcave lens, a fifth lens L5 is a biconcave lens, and a sixth lens L6 is a biconvex lens. The lenses L1 to L6 described above form the first lens group G1. A seventh lens L7 is a positive meniscus lens having a convex surface facing the enlargement side, an eighth lens L8 is a positive meniscus lens having a convex surface facing the enlargement side, a ninth lens L9 is a positive meniscus lens having a convex surface facing the reduction side, a tenth lens L10 is a biconcave lens, an eleventh lens L11 is a biconvex lens, a twelfth lens L12 is a biconvex lens, and a thirteenth lens L13 is a negative meniscus lens having a convex surface facing the reduction side. The following fourteenth to sixteenth lenses L14 to L16 form the fifth lens group G5. The fourteenth lens L14 is a biconvex lens, the fifteenth lens L15 is a biconcave lens, and the sixteenth lens L16 is a biconvex lens. A seventeenth lens L17 in the sixth lens group G6, which is closest to the reduction side, is a biconvex lens. An aperture ST is associated with the third lens group G3.

Figures 9A, 9B:
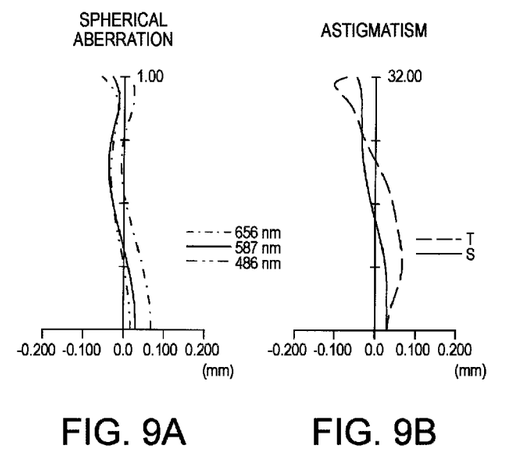
FIGS. 9A to 9C show aberrations produced by a projection lens according to Example 4 operating at a wide angle end.
Figure 9C:
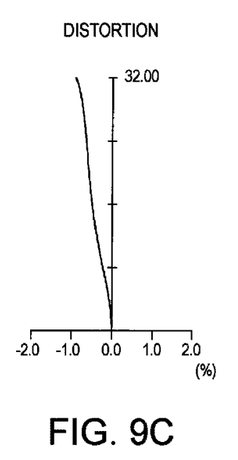
Figures 9D, 9E:
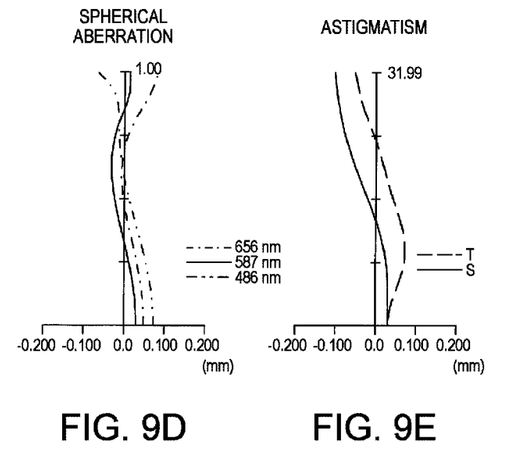
FIGS. 9D to 9F show aberrations produced by the projection lens according to Example 4 operating at a telescopic end.
Figure 9F:
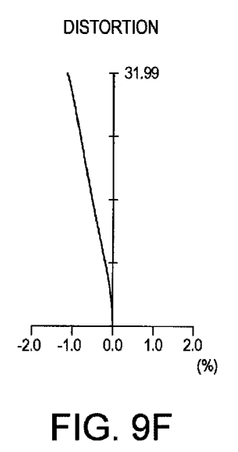

FIGS. 9A to 9C show reduction-side aberrations (spherical aberration, astigmatism, and distortion) produced by the projection system 44 according to Example 4 operating at the wide angle end. FIGS. 9D to 9F show the reduction-side aberrations produced by the projection system 44 operating at the telescopic end.

The invention is not limited to the embodiment and examples described above and can be implemented in a variety of aspects to the extent that they do not depart from the substance of the invention.

Further, an object to be enlarged and projected by the projection system 40 is not limited to the liquid crystal panels 18G, 18R, and 18B, and an image formed by a digital micromirror device having micromirrors as pixels and any of a variety of other light modulation devices can be enlarged and projected by the projection system 40.

The entire disclosure of Japanese Patent Application No. 2015-010071, filed Jan. 22, 2015 is expressly incorporated by reference herein.

What is claimed is:

1. A projection system comprising a first lens group to an n-th lens group with n being 6 or 7 sequentially arranged from an enlargement side,
wherein the first lens group includes a first-first lens group and a first-second lens group sequentially arranged from the enlargement side,
the first-first lens group and the first-second lens group are separated from each other by a variable distance for image plane correction,
the first lens group and the n-th lens group are fixed and the second lens group to an (n−1)-th group are moved when magnification is changed, and
the following conditional expression is satisfied:

$2<BF/fw<2.8$ where fw represents a focal length of the projection system operating at a wide angle end, and BF represents an air conversion length of a back focal distance of the projection system.

2. The projection system according to claim 1,
wherein in the first-first lens group, a lens disposed in a second position counted from the enlargement side is an aspheric lens.

3. A projection-type image display apparatus comprising:
the projection system according to claim 2; and
an image formation optical section provided on an optical path upstream of the projection system.

4. The projection system according to claim 1,
wherein the (n−1)-th lens group consists of a positive first lens, a negative second lens, and a positive third lens.

5. The projection system according to claim 4,
wherein the following conditional expression is satisfied:

$|f(n-1)/fw|>5$ where f(n−1) represents a focal length of the (n−1)-th lens group, and
the following conditional expressions are satisfied:

$vdf1-vdf2>20$ $vdf3-vdf2>20$ where vdf1 represents an Abbe number of the first lens, vdf2 represents the Abbe number of the second lens, and vdf3 represents the Abbe number of the third lens.

6. A projection-type image display apparatus comprising:
the projection system according to claim 5; and
an image formation optical section provided on an optical path upstream of the projection system.

7. The projection system according to claim 4,
wherein in the (n−1)-th lens group, the first lens and the second lens, and the second lens and the third lens are both separated by a distance of 3 mm or shorter.

8. A projection-type image display apparatus comprising:
the projection system according to claim 7; and
an image formation optical section provided on an optical path upstream of the projection system.

9. A projection-type image display apparatus comprising:
the projection system according to claim 4; and
an image formation optical section provided on an optical path upstream of the projection system.

10. The projection system according to claim 1,
wherein the first lens group includes three negative spherical lenses adjacent to each other, and
the following conditional expression is satisfied:

$vdN>60$ where vdN represents an Abbe number of the negative spherical lens closest to the reduction side among the three negative spherical lenses.

11. A projection-type image display apparatus comprising:
the projection system according to claim 10; and
an image formation optical section provided on an optical path upstream of the projection system.

12. The projection system according to claim 1,
wherein a zooming ratio over a range within which the magnification is changed is 1.4 or smaller.

13. A projection-type image display apparatus comprising:
the projection system according to claim 12; and
an image formation optical section provided on an optical path upstream of the projection system.

14. The projection system according to claim 1,
wherein each of the first lens group to the n-th lens group consists single lenses.

15. A projection-type image display apparatus comprising:
the projection system according to claim 14; and
an image formation optical section provided on an optical path upstream of the projection system.

16. A projection-type image display apparatus comprising:
the projection system according to claim 1; and
an image formation optical section provided on an optical path upstream of the projection system.

* * * * *